United States Patent Office 2,921,927
Patented Jan. 19, 1960

2,921,927
PROCESS FOR CURING A SULFUR-CURABLE POLYALKYLENEETHER POLYURETHANE ELASTOMER

Ernest Csendes, Wilmington, Del., assignor to E. I. du Pont de Nemours and Company, Wilmington, Del., a corporation of Delaware No Drawing. Application July 26, 1957
Serial No. 674,312

3 Claims. (Cl. 260—77.5)

This invention is directed to an improved process for sulfur-curing polyalkyleneether polyurethane elastomers which have as cure sites side chains containing terminal ethylenic unsaturation. Existing procedures require more time for the vulcanizate to attain optimum properties than is commercially desirable.

It is an object of the present invention to provide a faster process for sulfur-curing polyalkyleneether polyurethane elastomers having side chain cure sites containing terminal ethylenic unsaturation.

Other objects will become apparent in the following description and claims.

More specifically, the present invention is directed to a process of curing a sulfur-curable polyalkyleneether polyurethane elastomer, said elastomer having at least one side chain containing a terminal $—CH=CH_2$ group for every 8000 units of polymer molecular weight, by heating with sulfur, 2-mercaptobenzothiazole and 2,2'-dithiobisbenzothiazole, the improvement consisting of incorporating into the mixture prior to curing a zinc halide complex of the formula $ZnX_2 \cdot (A)_n$ where X is Cl, Br, or I; A is a heterocyclic tertiary amine which has at least one unsubstituted position alpha to the N-atom; n is an integer with values 1 or 2, concentration of said zinc halide ranging from 0.0007 to 0.003 molar part per 100 parts by weight of polyurethane elastomer.

Compounded elastomer stocks are rapidly cured when these zinc halide-heterocyclic tertiary amine complexes are present. The superiority of these complexes to accelerators existing in the art such as zinc chloride and the 1:1 molar zinc chloride:2,2'-dithiobisbenzothiazole complex is particularly evident when cure-retarding fillers such as channel carbon blacks are also present. Example 1 illustrates this point; vulcanizate properties are consistently better when zinc chloride·(quinoline)$_2$ is used in place of zinc chloride:2,2'-dithiobisbenzothiazole throughout the cure cycles.

The benefits resulting from the use of these zinc halide heterocyclic tertiary amine complexes in the sulfur-curing of unsaturated polyurethane elastomers are entirely unexpected. It has been known that zinc halide complexes of strong amines (e.g., benzylamine, piperidine, ethylenediamine, and N-ethyl cyclohexylamine) accelerate the sulfur-curing of natural rubber. U.S. 2,184,238 may be consulted for details about their use. However, it had been found that vulcanizates of polyurethane elastomers containing $—C=CH_2$ side chains were degraded by the use of these complexes.

The zinc halide amine complexes utilized according to the present invention must meet certain criteria to be acceptable. The complex itself must be stable enough so that it can be easily prepared and stored without decomposition. Many nucleophilic substances form complexes with zinc chloride but specific structural requirements of the donor must be met for stability. Steric hindrance should be at a minimum. It is possible to prepare stable complexes easily by the reaction of zinc chloride with heterocyclic tertiary amines which have free positions next to the nitrogen atom. Pyridine reacts readily with zinc chloride. However, 2-methyl pyridine reacts slowly; 2,6-dimethylpyridine does not form a complex.

The zinc halide amine complex must also meet the requirement that any amine liberated from the complex at the curing temperature must not be detrimental to the vulcanizate. Primary and secondary amines damage polyurethane elastomer by peptization; the polymer chains are cleaved with consequent loss in desirable stress-strain properties. Aliphatic tertiary amines damage the vulcanizate also. Heterocyclic tertiary amines do not harm the elastomer at the concentration levels used for the zinc halide:heterocyclic amine complexes in this process. The zinc chloride·(quinoline)$_2$ complex slowly liberates a molecule of quinoline at about 140° C. to become zinc chloride·(quinoline) which is stable at least to 200° C. No harmful effect has been observed from the quinoline liberated in the curing cycles employed in the process of the subject invention.

Zinc halide heterocyclic tertiary amine complexes may be prepared from zinc chloride, zinc bromide, and zinc iodide. The heterocyclic tertiary amines useful in this work have at least one unsubstituted position alpha to the nitrogen atom. Representative examples of suitable amines are: pyridine, beta-picoline, gamma-picoline, quinoline and isoquinoline. It is to be understood that mixtures of these complexes may be used in curing the vulcanizates. For example, a mixture containing zinc chloride·(pyridine)$_2$ and zinc iodide·(quinoline) and zinc bromide·(beta-picoline)$_2$ may be employed.

The concentration of the zinc halide heterocyclic tertiary amine complex used must be sufficient to supply 0.0007 to 0.003 molar part of zinc halide per 100 parts by weight of elastomer. When less than the prescribed amount of accelerator is used, the cure time required will be inconveniently long. When more than the recommended amount of accelerator is employed the stock will become somewhat scorchy and hard to handle.

It is significant that the catalytic activity resides in the zinc chloride·(quinoline) complex. A mixture of zinc chloride (or the zinc chloride:2,2'-dithiobisbenzothiazole complex) and quinoline cannot replace the zinc chloride·(quinoline)$_2$ complex; the mixture is much less active than the complex catalyst. None of these heterocyclic amine complexes can be replaced by a mixture of the amine and zinc chloride in the sulfur-curing of polyurethane elastomers which contain side chains with $—CH=CH_2$ cure sites.

These zinc heterocyclic amine complexes are old in the art. Their preparation has been described by W. Lang [Ber., 21, 1579, 1584 (1888)], [Comptes rend., 124, 1533 (1897)], and H. Schiff [Ann., 131, 112 (1864)]. In general, the heterocyclic amine is added to a well-agitated alcoholic solution of the zinc halide at room temperature. The complex precipitates from solution and is collected by filtration. The filter cake is subsequently washed with a small amount of alcohol and dried under vacuum. Zinc chloride·(quinoline) is prepared by heating the zinc chloride·(quinoline)$_2$ complex at 150° C. for 20 hours under high vacuum to remove the quinoline liberated by the thermally-induced degradation of the complex.

Conventional elastomer processing steps may be used in the fabrication of cured articles. In carrying out the process of the present invention for molded articles, the uncured polyurethane polymer is normally milled to a smooth sheet on a rubber mill and the various ingredients are incorporated with the polymer on the mill. The stock is then sheeted off the mill, placed in a suitable mold, which is then closed completed by heating the mold under pressure. The temperature and time used to effect a cure are interrelated. Higher temperatures require shorter times and vice versa. There is, of course, an upper limit on the temperature which may be used; however, in general temperatures of from about 100–170° C. are useful with curing times of from about 10 minutes to 3 hours. The preferred temperature range is 140 to 150° C.

The amount of sulfur which is used may range from about 0.5 to 2 parts per 100 parts of polyurethane polymer. It is to be understood that somewhat greater or lesser amounts of sulfur may be used with the greater amounts giving a progressively increasing tighter cure which is shown by an increased modulus. The amount of 2,2'-dithiobisbenzothiazole which is used should range from 2 to 4 parts per 100 parts of elastomer; however, it is to be understood that here again greater or lesser amounts may be used. In general, it is desirable to have a weight ratio of sulfur to 2,2'-dithiobisbenzothiazole of less than 1:1, with a preferred weight ratio range being from 1:2 to 1:4. The amount of 2-mercaptobenzothiazole which is used should range from 1 to 2 parts per 100 parts of elastomer; however, greater or lesser amounts may be used.

The polymers which may be cured according to the present invention are wholly polyurethane polymers and they have side chains containing terminal aliphatic $-CH=CH_2$ groups. In general, these polymers may be prepared by reacting a polyalkyleneether glycol, having a molecular weight of from about 750 to 10,000, with a molar excess of an organic diisocyanate, such as toluene-2,4-diisocyanate, followed by the reaction with a non-polymeric glycol, such as propanediol, with the side chain containing terminal $-CH=CH_2$ groups being present on any of these reactants. The reaction is between the terminal hydroxyl groups of the glycols and the terminal isocyanate groups of the organic diisocyanate so as to yield a polyurethane polymer. Another method which may be used is to first react the non-polymeric glycol with a molar excess of an organic diisocyanate and then react this isocyanate-terminated intermediate with a polyalkyleneether glycol.

In addition to the above-discussed methods, polyurethane polymers which may be cured according to the process of the present invention may be prepared by reacting the polyalkyleneether glycol and the non-polymeric glycol with phosgene so as to form the bis-chloroformates which may then be reacted with a primary diamine so as to provide a polyurethane polymer. Instead of utilizing a primary diamine, a secondary diamine may be used, in which case the resulting polyurethane polymer will have no urethane nitrogens substituted with hydrogen.

The polyalkyleneether glycols which are useful in the preparation of the polyurethane polymers which may be cured according to the process of the present invention are compounds which have the general formula $HO(RO)_nH$ wherein R is a divalent alkylene radical and n is an integer sufficiently large that the glycol has a molecular weight of at least 750. Not all the alkylene radicals present need be the same. These glycols may be derived by the polymerizations of cyclic ethers, such as alkyleneoxides or dioxolane or by the condensation of glycols. The preferred polyalkyleneether glycol is polytetramethyleneether glycol, also known as poly-n-butyleneether glycol. Polyethyleneether glycol, polypropyleneether glycol, ethyleneoxide-modified-polypropyleneether glycol, 1,2-polydimethylethyleneether glycol and polydecamethyleneether glycol are other typical representatives of this class.

The non-polymeric glycols which are used in the preparation of these polyurethane polymers are compounds which should have molecular weights below about 200. In general, it is desirable that the side chain containing the terminal aliphatic $-CH=CH_2$ group be introduced into the polyurethane polymer by means of this non-polymeric glycol reactant. Representative compounds which may be used include 3-(allyloxy)-1,5-pentanediol, 3-(allyloxy)-1,2-propanediol, 2-[(allyloxy) methyl]-2-methyl-1,3-propanediol, 2,2'-(4-allyl-m-phenylenedioxy)diethanol, 3-(4-allyl-2-methoxyphenoxy)-1,2-propanediol, 3-(o-allylphenoxy)-1,2-propanediol, 2-[(allyloxy) ethyl]-1,3-propanediol, 2-[(allyloxy) ethyl]-2-methyl-1,3-propanediol, 2-methyl-2[(10-undecenyloxy) methyl]-1,3-propanediol, 2,2'-(allylimino)-diethanol, 2-[(allyloxy) methyl]-1,3-propanediol, and 3-(4-allyl-2-methoxyphenoxy)-1,2-propanediol.

Any of a wide variety of organic diisocyanates may be employed to react with the glycols to prepare these polyurethane polymers, including aromatic, aliphatic and cycloaliphatic diisocyanates and combinations of these types. Mixtures of two or more organic diisocyanates may be used. Representative compounds include toluene-2,4-diisocyanate, m-phenylene diisocyanate, 4-chloro-1,3-phenylene diisocyanate, cumene-2,4-diisocyanate, anisole-2,4-diisocyanate, 4,4'-bisphenylene diisocyanate, 1,5-naphthalene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthalene diisocyanate. Arylene diisocyanates, that is, those in which each of the two isocyanate groups is attached directly to an aromatic ring, are preferred. Compounds such as toluene-2,4-diisocyanate in which the two isocyanate groups differ in reactivity are particularly desirable.

The following representative examples will better illustrate the nature of the present invention; however, the invention is not intended to be limited to these examples. Parts are by weight unless otherwise indicated. In these examples the following symbols are used:

MBTS—refers to 2,2'-dithiobisbenzothiazole, also known as benzothiazyl disulfide MBT—refers to 2-mercaptobenzothiazole The following ASTM procedures are used for the tests carried out in the examples:

Heat build-up—D 623–52T (method A)
Compression set—D 395–53T (method B, 22 hrs. 70° C.)

The stress-strain properties are determined using the Williams ring tester.

PREPARATION OF POLYMER A 3 mols of toluene-2,4-diisocyanate are added to 1 mol of 3-(allyloxy)-1,2-propanediol and the mixture is agitated for 3 hours at 80° C. under an atmosphere of nitrogen. This mixture is treated by addition of 2 mols of polytetramethyleneether glycol of molecular weight 1000 and subsequently agitated at 80° C. for 1 hour. It is then transferred to a polyethylene-lined container and heated in an oven at 80° C. for 72 hours. A rubbery polymer is obtained which has an average of one side chain allyloxy group for each 2650 units of molecular weight.

Representative examples illustrating the present invention follow:

*Example 1*

(A) *Preparation of* $ZnCl_2 \cdot (quinoline)_2$ *complex.*—This compound is prepared by the method of H. Schiff [Ann., 131, 112 (1864)] modified by using an alcoholic solution in place of the aqueous solution specified. 13.6 parts of zinc chloride is dissolved in 78.5 parts of ethyl alcohol at 50° C. The mixture is filtered and the filtrate is treated at 30° C. by dropwise addition of 30.7 parts of quinoline. The temperature rises to about 42° C. and a thick slurry forms. Forty parts of ethanol is added and the mixture is agitated for 1 hour. The precipitated complex is then collected as a filter cake, washed with a small amount of diethyl ether, and dried in a desiccator over concentrated sulfuric acid. The yield is 37.1 parts (94.1% of theory). The X-ray diffraction pattern of the product indicates that less than 5% free $ZnCl_2$ is present.

(B) *Compounding the elastomer.*—On a rubber roll mill two batches are made up. Each contains 100 parts of polymer A, 30 parts of conductive channel black, 15 parts of a neutral stable synthetic p-coumarone-indene resin (commerically available from the Barrett Division of the Allied Chemical & Dye Corporation as Cumar type W2 ½), 1 part of sulfur and 1 part of 2-mercaptobenzothiazole. Each of these stocks is further compounded. Table I–1, which follows, shows the additions made (parts are by weight based on 100 parts of polymer A).

TABLE I–1

Compounding additives

| Additive | Stock IA | Stock IB |
|---|---|---|
| MBTS | | |
| $ZnCl_2 \cdot (Quinoline)_2$ | 3.0 | 2.5 |
| $ZnCl_2 \cdot MBTS$ | 0.75 | |
| | | 0.70 |

(C) *Curing the elastomer.*—Portions of these compounded stocks are cured in a press for 30, 60, 90 and 120 minutes at 140° C. The properties of the elastomers obtained are given in Table I–2 below.

TABLE I–2

Vulcanizate properties

| Cure Time (min.) | Stock A | | | | Stock B | | | |
|---|---|---|---|---|---|---|---|---|
| | 30 | 60 | 90 | 120 | 30 | 60 | 90 | 120 |
| Property: | | | | | | | | |
| $M_{300}$ (p.s.i.) at 25° C | 1,020 | 1,630 | 1,980 | 2,040 | 820 | 1,340 | 1,640 | 1,770 |
| $T_B$ (p.s.i.) at 25° C | 3,200 | 4,050 | 4,200 | 4,200 | 2,150 | 3,900 | 3,900 | 3,900 |
| $E_B$ (percent) at 25° C | 530 | 470 | 440 | 430 | 500 | 500 | 470 | 440 |
| Comp. Set (percent) at 70° C | 52 | 32 | 30 | 28 | 92 | 61 | 41 | 38 |
| Heat Build-up: | | | | | | | | |
| $\Delta C$ (mils) [1] | collapsed | 82 | 55 | 79 | collapsed | collapsed | 134 | 156 |

[1] $\Delta C$=final compression–minimum compression.

*Example 2*

(A) *Preparation of the* $ZnCl_2 \cdot (pyridine)_2$ *complex.*—This compound is prepared by the method of W. Lang [Ber., 21, 1579 (1888)]. 27.2 parts of zinc chloride is dissolved in 78.5 parts of ethyl alcohol at 50° C. The mixture is filtered and the filtrate is subsequently cooled to 30° C. Treatment by dropwise addition of 33.4 parts of pyridine causes heat evolution and the temperature climbs to 60° C. The mixture thickens during the addition and requires about 30 parts of ethanol to facilitate the agitation. The mixture is stirred for about one hour. It is then filtered; the filter cake is washed with a small amount of ether and is dried in a desiccator over concentrated sulfuric acid. 52.7 parts of product is obtained. Its X-ray diffraction pattern shows it contains less than 5% free $ZnCl_2$.

(B) *Preparation of the* $ZnCl_2$ *quinoline complex.*—20 parts of $ZnCl_2 \cdot (quinoline)_2$ is heated at 150° C. for 20 hours under vacuum. A weight loss of 6.5 parts occurs. Analysis of the product for Cl, N, and Zn content indicates that it is $ZnCl_2$:quinoline.

(C) *Preparation of the* $ZnCl_2 \cdot (gamma\text{-}picoline)_2$ *complex.*—This complex is prepared by treating an alcoholic solution of zinc chloride with gamma-picoline by the same procedure described above for making the $ZnCl_2 \cdot (pyridine)_2$ complex.

(D) *Compounding the elastomer.*—On a rubber roll-mill 4 stocks are compounded. Each one contains 100 parts of polymer A, 30 parts of high abrasion furnace black, 4 parts of 2,2'-dithiobisbenzothiazole, 1 part of 2-mercaptobenzothiazole, and 1 part of sulfur. Each of these stocks is also compounded with a zinc halide curing accelerator. Table II–1, which follows, shows the additions made (parts are by weight based on 100 parts of polymer A).

TABLE II–1

Compounding additives

| Additive | Stock | | | |
|---|---|---|---|---|
| | 2A | 2B | 2C | 2D |
| $ZnCl_2 \cdot (Quinoline)_2$ | 0.31 | | | |
| $ZnCl_2 \cdot Quinoline$ | | 0.21 | | |
| $ZnCl_2 \cdot (Pyridine)_2$ | | | 0.23 | |
| $ZnCl_2 \cdot (Gamma\text{-}Picoline)_2$ | | | | 0.25 |

(E) *Curing the elastomer.*—These compounded stocks are subsequently cured in a press at 150° C. for 80 minutes. The properties of the vulcanizates obtained are given in Table II–2 below.

TABLE II–2

Vulcanizate properties

| Property | Stock | | | |
|---|---|---|---|---|
| | 2A | 2B | 2C | 2D |
| $M_{300}$ (p.s.i.) at 25° C | 3,050 | 3,200 | 3,050 | 3,000 |
| $T_B$ (p.s.i.) at 25° C | 4,650 | 4,750 | 4,800 | 4,650 |
| $E_B$ (percent) at 25° C | 380 | 380 | 400 | 395 |
| Comp. Set (percent) at 70° C | 22 | 22 | 27 | 26 |
| Heat Build-up: | | | | |
| $\Delta C$ (mils) | 70 | 68 | 92 | 102 |

$\Delta C$=final compression–minimum compression.

The embodiments of the invention in which an exclusive property or privilege is claimed are defined as follows:

1. In the process of curing a sulfur-curable polyalkyleneether polyurethane elastomer at a temperature within the range of 100 to 170° C., said elastomer being selected from the group consisting of (A) the reaction product of (1) a polyalkyleneether glycol having a molecular weight of from about 750 to 10,000, (2) an organic diisocyanate, and, (3) a non-polymeric glycol, and (B) the reaction product of a bis-chloroformate of a polyalkyleneether glycol having a molecular weight of from about 750 to 10,000, a bis-chloroformate of a non-polymeric glycol and a diamine taken from the group consisting of primary and secondary diamines, said elastomer having a side chain containing at least one terminal —CH=$CH_2$ group for each 8000 units of molecular weight of elastomer, by heating with from about 0.5 to about 2.0 parts sulfur per 100 parts of said elastomer, 1–2 parts 2-mercaptobenzothiazole, and from about 2 to about 4 parts 2,2'-dithiobisbenzothiazole per 100 parts elastomer, the improvement which consists of incorporating into the polymeric mixture, prior to curing, from about 0.0007 to about 0.003 molar part per 100 parts by weight of said polyurethane elastomer of zinc in the form of a complex having the formula $ZnX_2 \cdot (A)_n$, wherein X is taken from the group consisting of Cl, Br, and I; A is a heterocyclic tertiary amine having at least one unsubstituted position alpha to the N atom, the nitrogen atom of said tertiary amine being in the heterocyclic nucleus, said nucleus being aromatic, and, $n$ is an integer taken from the group consisting of 1 and 2.

2. The process of claim 1 where $ZnX_2 \cdot (A)_n$ is zinc chloride·(quinoline).

3. The process of claim 1 where $ZnX_2 \cdot (A)_n$ is zinc chloride·(pyridine)$_2$.

References Cited in the file of this patent
UNITED STATES PATENTS

| | | |
|---|---|---|
| 2,279,875 | Semon | Apr. 14, 1942 |
| 2,581,905 | Carr et al. | Jan. 8, 1952 |
| 2,808,391 | Pattison | Oct. 1, 1957 |